US005652059A

United States Patent [19]
Margel

[11] Patent Number: 5,652,059
[45] Date of Patent: Jul. 29, 1997

[54] METHOD FOR ATTACHING MICROSPHERES TO A SUBSTRATE

[75] Inventor: Shlomo Margel, Rehovot, Israel

[73] Assignee: Bar Ilan University, Israel

[21] Appl. No.: 378,061

[22] Filed: Jan. 25, 1995

Related U.S. Application Data

[63] Continuation of Ser. No. 979,900, Nov. 23, 1992, abandoned.

[30] Foreign Application Priority Data

Nov. 20, 1991 [IL] Israel ........................................ 100105

[51] Int. Cl.$^6$ ........................................................ B32B 5/22
[52] U.S. Cl. ........................... 428/403; 428/402; 428/327
[58] Field of Search ....................................... 428/402, 403, 428/327

[56] References Cited

U.S. PATENT DOCUMENTS

| | | | |
|---|---|---|---|
| 3,795,313 | 3/1974 | Kirkland et al. | 210/198 |
| 4,070,283 | 1/1978 | Kirkland | 210/31 |
| 4,111,838 | 9/1978 | Shaeffer et al. | 252/430 |
| 4,252,644 | 2/1981 | Small et al. | 210/656 |
| 4,447,559 | 5/1984 | Hanaoka et al. | 521/28 |
| 4,534,996 | 8/1985 | Rembaum et al. | 427/44 |
| 4,539,061 | 9/1985 | Sagiv | 156/278 |
| 4,548,863 | 10/1985 | Hicks et al. | 428/325 |
| 4,673,474 | 6/1987 | Ogawa | 204/157.64 |

FOREIGN PATENT DOCUMENTS

| | | |
|---|---|---|
| 0071704 | 2/1983 | European Pat. Off. . |
| 0346037 | 12/1989 | European Pat. Off. . |
| 0357479 | 3/1990 | European Pat. Off. . |
| 0385587 | 9/1990 | European Pat. Off. . |
| 2609835 | 7/1988 | France . |
| 67619 | 4/1983 | Israel . |

OTHER PUBLICATIONS

Small et al., "Novel Ion Exchange Chromatographic Method Using Conductimetric Detection," *Anal. Chem.*, 1975, 47, pp. 1801–1809.

Palzer et al., In Vitro, 1978, 14, 336.

Rembaum et al., "Labeled Cells," *Chem. Tech.*, 1978, 8, 182–190.

Pecht et al., "Drug Conjugates of Polymeric Microspheres as Tools in Cell Biology," Plenum Publishing Corporation, 1982, pp. 109–124.

Longo et al., "Preparation of Hydrophilic Albumin Microspheres Using Polymeric Dispersing Agents," *J. Pharm. Sci.*, 1982, 71(12), 1323–1328.

Ugelstad et al., "Monodisperse polymer particles—a step forward for chromatography," *Nature* (London), 1983, 303, 5.

Margel, "Agarose–Polyaldehyde Microsphere Beads: Synthesis and Biomedical Applications," *Applied Biochemistry and Biotechnology*, 1983, 8, 523–529.

Syper et al., "A Convenient Oxidation of Halomethylarenes and Alcohols to Aldehydes with Dimethyl Seienoxide and Potassium Benzeneselenite," *J. Synthesis*, 1984, 747–753.

Kandzia et al., "Magnetic Albumin/Protein A Immunomicrospheres. I. Preparation, Antibody Binding Capacity and Chemical Stability," *J. Immun. Meth.*, 1984, 75, 31–41.

Lazar et al., "Agarose–Polyacrolein Microsphere Beads, A New Microcarrier Culturing System," *Dev. in Biol. Stan.*, 1985, 60, 457–465.

Margel, "Polyacrolein Microspheres," *Meth. in Enzymology*, 1985, 112, pp. 164–175.

Pines et al., "Polyacrolein Microspheres as a New Solid Phase for Radioimmunoassay," *J. of Immunoassay*, 1986, 7, 1–16.

Balachander et al., "Functionalized Siloxy–Anchored Monolayers with Exposed Amino, Azido, Bromo, or Cyano Groups," *Tetrahedron Letters*, 1988, 29, 5593–5594.

Whitesides et al., "Organic Chemistry in Two Dimensions: Surface–Functionalized Polymers and Self-Assembled Monolayer Films," *Chemtracts—Organic Chemistry*, 1988, 171–187.

Wikstrom et al., "Gas Phase Silylation, A Rapid Method for Preparation of High–Performance Liquid Chromatography Supports," *J. of Chromatography*, 1988, 455,105–117.

Bain et al., "Modeling Organic Surfaces with Self-Assembled Monolayers," *Chem. Int. Ed. Engl.*, 1989, 28(4), 506–512.

Margel et al., "Polychloromethylstyrene Microspheres: Synthesis and Characterization," *Poly. Sci. Ed.*, 1991, 29, 347–355.

*Primary Examiner*—Margaret W. Glass
*Attorney, Agent, or Firm*—Marshall, O'Toole, Gerstein, Murray & Borun

[57] ABSTRACT

A composition of matter includes a solid substrate having covalent bonds, provided by a connecting ligand, to at least one of (a) and (b), namely: (a) a single layer of at least one species of microspheres containing residual reactive functions; (b) a multiplicity of layers of at least one species of microspheres, wherein adjoining layers of multiplicity of layers are covalently linked together, the innermost layer of the multiplicity of layers having the covalent bonds to the solid substrate connected thereto, while at least the outermost layer of the multiplicity of layers contains residual reactive functions; the species of microspheres being selected from microspheres of silica, polyacrylic acid, polyglutaraldehyde, polyacrolein, poly(chloromethylated styrene) and albumin. At least some of the residual reactive functions may be used to immobilize drugs, prodrugs, proteins, biological cells and other controllably releasable substances.

5 Claims, 2 Drawing Sheets

METHOD FOR ATTACHING MICROSPHERES TO A SUBSTRATE

This is a continuation of U.S. application Ser. No. 07/979,900, filed Nov. 23, 1992, now abandoned.

FIELD AND BACKGROUND OF THE INVENTION

The present invention relates to a composition of matter in which microspheres are covalently bonded to a support of solid substrate, the thus-bonded microspheres containing residual reactive functions.

Due to their spherical shape and high surface area, microspheres have numerous applications such as specific cell labelling, cell separation, phagocytosis, diagnostics, cell growth, affinity chromatography and hemoperfusion (see e.g., Margel, S., Applied Biochemistry and Biotechnology, 1983, 8, 523; Lazar, A., Silverstein, L., Margel, S. and Mizrahi, M., Dev. in Biol. Stand., 1985, 60, 456; Pines, M. and Margel, S., J. of Immunoassay, 1986, 7, 97; Palzer, R., Walton, J. and Rembaum, A., In Vitro, 1978, 14, 336; Rembaum, A. Yen, S. P. S. and Volkson, W., Chem. Tech., 1978, 8, 182). Recently, in order to improve the quality and usefulness of polymeric microspheres, significant progress has been made in the synthesis of microspheres with narrow size distribution. Highly uniform polymeric microspheres are currently effective for applications such as adsorbents for HPLC, calibration standards and spacers for liquid crystals [Ugelstad, J., Soderberg, L., Berge, A. and Bergstom, J., Nature (London), 1983, 303, 5].

From a practical point of view, the efficiency and use of polymeric microspheres in solution, particularly microspheres smaller in their diameter than approximately 0.4µ, are still limited, because of some major disadvantages, e.g., difficulties in separation of free ligand from ligand bonded to the microspheres and instability of the microspheres in solution towards agglutination. The latter disadvantage is the major reason for the difficulties obtaining while carrying out reactions with polymeric microspheres.

Polymeric microspheres covalently bonded with appropriate antibodies or lectins have been studied for mapping of cell receptors. For example, polyaldehyde microspheres in sizes ranging from 0.1µ to 0.7µ bonded with anti-thy 1,2 antibodies were used for specific labelling of T lymphocytes. Similar microspheres covalently bonded with the drug disodium chromoglycate were used for specific labelling of rat basophilic leukemia cells (Pacht, I., Mazurek, N. and Margel, S., Drug Conjugates of Polymeric Microspheres as Tools in Cell Biology, Plenum Publishing Corporation, 1982, pp. 109–123).

Polystyrene beads crosslinked with divinylbenzene of approximately 30µ diameter containing on the surface sulfate groups (negative charge) electrostatically attached to polystyrene particles of 0.1–0.5µ diameter containing quaternary ammonium groups (and which are available from Dionex Corporation), are used in ion chromatography for ion separation (Small, H., Stevens, T. S. and Bauman, W. W., Anal. Chem., 1975, 47, 1801; Gjesde, D. T. and Fritz, J. S., in "Ion Chromatography", 2nd edn., Hühig, Heidelberg, 1987). These hybrid type ion exchange resins (pellicular resins) have a low capacity; moreover, the attached colloid particles are limited in their size (up to approximately 0.5µ) and can be removed from the bead core by competition reaction.

A few patents describe the adhesion of various microsphere types, e.g. glass microspheres, to an appropriate support, by impregnating the latter with the microspheres in the presence of a thickener and an adhesive agent for binding the microspheres to the support. This binding agent usually contains epoxide compounds or other adhesive materials (Seuzaret, L., FR 2,609,835; Thomson, E. et al EP 209337; Hicks, I. A. et al, U.S. Pat. No. 4,548,863).

The patents literature also describes a procedure for grafting of polyacrolein microspheres having diameters of to 0.2µ onto the surface of organic polymers such as polystyrene, by high energy radiation (Co irradiation) process (Margel, S., IL 67619; Rembaum, A. et al, U.S. Pat. No. 4,534,996). According to this process, a deaerated acrolein in aqueous solution is polymerized in the presence of an appropriate surfactant and the organic support, by the high energy source. However, this method suffers from a number of major disadvantages: (a), the need for a high energy source; (b) the mechanism for the high energy process is not clear and the process is not properly controllable; (c) the structure of the obtained composite materials is not homogeneous and distinctive, and furthermore, part of the surface of the grafted support is barely coated with microspheres, while the other part of the surface is coated heterogeneously with one or several layers of microspheres; (d) the high energy process for covalent binding of polyacrolein microspheres onto the surface of polymers is not applicable to inorganic substrates, e.g. glass, semiconductive materials such as silicon, and some organic polymers such as polytetrafluoroethylene; (e) the high energy process is not applicable for binding onto the surface of solid substrates, microspheres which were previously prepared.

The present invention relates to compositions of matter which incorporate microspheres, while avoiding the disadvantages of the prior art products.

SUMMARY OF THE INVENTION

The present invention accordingly provides a composition of matter which comprises a solid substrate having covalent bonds to at least one member selected from sub-groups (a) and (b), namely: (a) substantially a single layer of at least one species of microspheres containing residual reactive functions; (b) a multiplicity of layers of at least one species of microspheres, wherein adjoining layers of the multiplicity of layers are covalently linked together, the innermost layer of the multiplicity of layers having the above-mentioned covalent bonds to the solid substrate connected thereto, while at least the outermost layer of the multiplicity of layers contains residual reactive functions. The covalent bonds referred to above may be provided by a ligand denoted "(A)", and the adjoining layers of the multiplicity of layers may be covalently linked together by a connecting ligand denoted "(B)", the ligands (A) and (B) being the same as or different from each other.

The microspheres included in the present compositions are preferably organic polymeric microspheres, but alternatively inorganic microspheres whether polymeric or not, such as glass and silica, are also deemed to be within the scope of the present invention. The microspheres have a preferred diameter within the range of 300 Angstrom units to 8µ.

It will be apparent that the at least one species of microspheres may consist of substantially a single species, or alternatively may consist of more than one species. Moreover, when there is present in the inventive compositions a multiplicity of microsphere layers, this may consist of substantially the same species of microspheres or may include different species of microspheres. More particularly, each layer of the multiplicity of layers may contain substantially only a particular species of microspheres, or alternatively, at least one layer of the multiplicity of layers may include more than one species of microspheres.

DETAILED DESCRIPTION OF THE INVENTION

Figure 1:
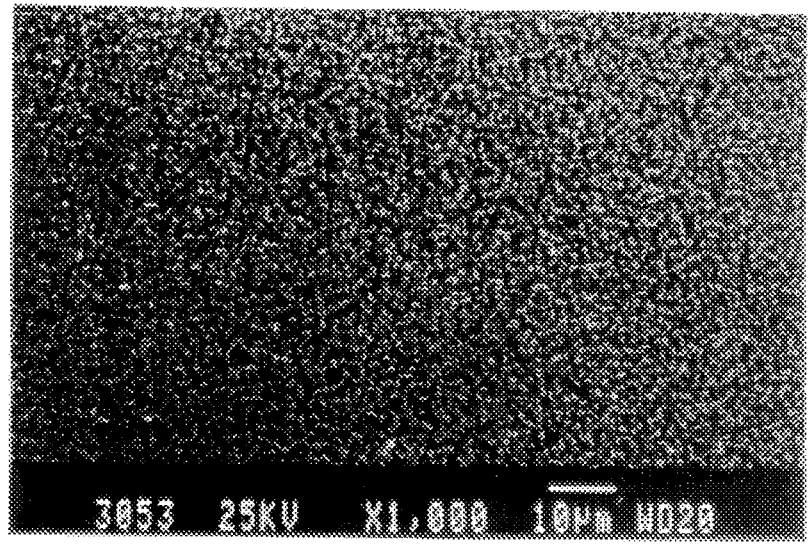
FIG. 1 shows an SEM photomicrograph depicting an embodiment of the invention in which polyacrolein microspheres are covalently bound to glass discs.
Figure 2A:
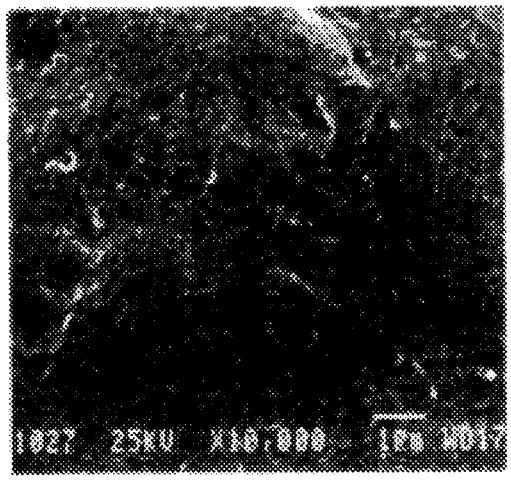
FIG. 2 shows SEM photomicrographs depicting embodiments of the invention in which polyacrolein microspheres are covalently bound to polyethylene (PE) film, namely, (a) an unmodified PE surface, (b) a PE[$CO_2H$] surface, (c) PE[$CH_2OSi$<($CH_2$)$_4NH_2$] surface, (d) a PE[$CH_2OSi$<($CH_2$)$_4NH_2$] surface already bonded to polyacrolein microspheres.
Figure 2B:
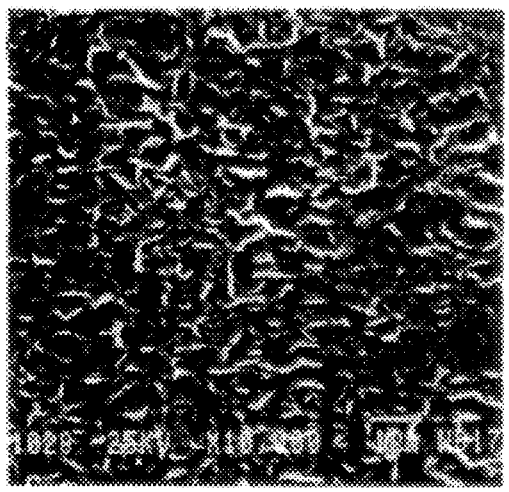
Figure 2C:
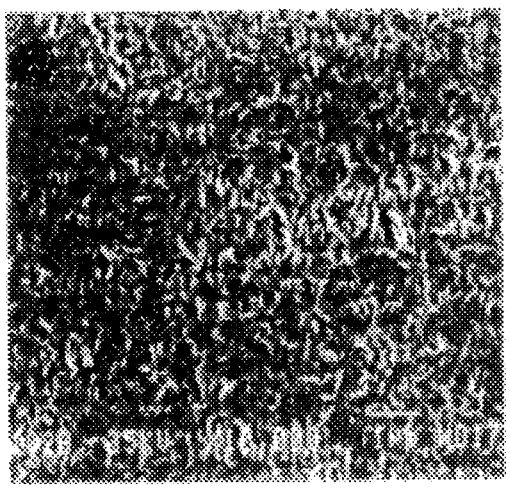
Figure 2D:
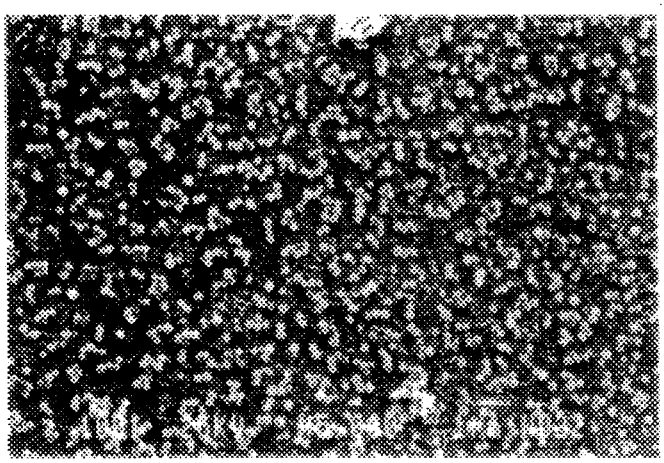

The present compositions, which incorporate supported microspheres, have many potential applications, for example those already outlined above where the use of microspheres is already known per se. Also, e.g. the present inventive compositions can be used to immobilize drugs, prodrugs, enzymes, proteins, antibodies, biological cells and other controllably releasable substances, merely by way of illustration. It is to be understood that immobilization of any of these materials may be effected by creation of chemical bonds, e.g. covalent, ionic and/or coordinate bonds between reactive functions therein and the residual reactive functions of the supported microspheres. Alternatively or additionally, however, these materials may have merely a physical connection with the supported microsphere compositions, e.g. they may be adsorbed thereon and/or entrapped therein, thus the term "immobilization" is to be understood broadly as denoting chemical bonding and/or physical connection.

The microspheres themselves may be made of, e.g., polyacrolein, polyglutaraldehyde, poly(chloromethylated styrene), albumin or silica, and may have a wide or narrow size distribution, as desired. The compositions or the microspheres which they incorporate may be designed with a variety of physical properties as regards, for example, biodegradability, rigidity or porosity. The solid substrates to which the microspheres are covalently bonded may in turn be made from a variety of materials, such as, for example, organic polymers (e.g. polyalkenes such as polyethylene), inorganic polymers such as glasses, or semiconductive materials such as silicon. Where the bonding between the microspheres and the solid substrates and/or the linkage between adjacent layers of microspheres in a multilayer system, is/are provided by ligands, these may have, e.g., omega-functional groups such as amino, cyano, trialkoxysilyl, trihalosilyl, formyl, haloalkyl, hydroxyalkyl, isocyanato, carboxyl or derivatives of carboxyl such as alkoxycarbonyl, halocarbonyl or hydrazidocarbonyl.

It will be apparent to persons skilled in the art that the compositions of the invention may be prepared in any convenient way. For example, a ligand can be covalently bonded to a solid substrate at one end of the ligand, and the other end of the ligand may be covalently attached to microspheres. More than one layer of microspheres may be assembled in a similar manner. It may be necessary to pretreat the substrate material to impart chemical activity to the surface thereof, for subsequent chemical reaction with a suitable ligand and/or reactive microspheres. It will also be appreciated that the reactions described are carried out in such manner as to leave a monolayer of microspheres, or at least the outer layer of a microsphere multilayer, with residual reactive functions. It will further be appreciated by skilled persons that residual reactive functions (such as those illustrated above) can be converted by methods known per se to other reactive functions. There now follows a description of exemplary but non-limiting starting materials.

Microsphere Starting Materials

Monodispersed silica microspheres of various sizes were obtained from Merck, Darmstadt, Germany. Monodispersed polyacrylic acid microspheres were purchased from Polysciences, Warrington, Pa., U.S.A. Polyglutaraldehyde microspheres and polyacrolein microspheres of various types (non-fluorescent, fluorescent and magnetic) and diameters were prepared according to a published method (Margel, S., Meth. in Enzymol., 1985, 112, 164). Poly (chloromethylated styrene) microspheres were prepared according to a published procedure (Margel, S., Nev, E. and Fisher, I., J. Poly. Sci. Chem. Ed., 1991, 29, 347). Albumin microspheres were prepared according to a published method (Longo, W. E., Iwata, H., Lindheimer, T. A. and Goldberg, E. P., J. Pharm. Sci. 1982, 71(12), 1323; Kanzta, J., Scholz, W., Anderson, M. J., and Ruchholz, W. M., J. Immun. Meth. 1984, 75, 31.

Surface Treatment of Substrate Materials

Glass substrates were washed with either aqueous NaOH solution (10%) or with aqueous HF solution at pH 3, followed by extensive washing with water and appropriate organic solvents (e.g. chloroform and/or ethanol). In most cases, the glass substrates were plasma treated before the surface modification. Silicon wafers were washed with appropriate organic solvents (e.g. chloroform and/or ethanol) and were then plasma treated before the surface modification. Polyethylene substrates, as well as cellulose substrates, were each washed with appropriate organic solvents (e.g. chloroform and/or ethanol) and were subsequently stored under anhydrous conditions.

Reactive Ligands

The following were purchased from ABCR, Karlsruhe, West Germany: $Cl_3Si(CH_2)_{17}CH_3$, $(MeO)_3Si(CH_2)_{17}CH_3$, $Cl_3Si(CH_2)_3CN$, $(MeO)_3Si(CH_2)_3CN$, $(MeO)_3Si(CH_2)_3NH_2$, $Cl_3Si(CH_2)_3CO_2Me$ and $(MeO)_3Si(CH_2)_3CO_2Me$ and p-$Cl_3SiC_6H_4CH_2Cl$.

$Cl_3Si(CH_2)_{16}CN$ was synthesized by a procedure similar to that described by Balachander, N. and Sukenik, C. N., Tet. Let., 1988, 29, 55, as follows:

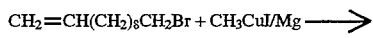

Synthesis of $Cl_3Si(CH_2)_{16}CO_2Me$ was accomplished similarly, using $I(CH_2)_5CO_2Me$ instead of $I(CH_2)_5CN$.

Surface Modification of the Substrates

Ligands of the type p-$Cl_3SiC_6H_4CH_2Cl$, $Cl_3Si(CH_2)_nX$ and/or $(RO)_3Si(CH_2)_nX$, where RO is alkoxy, n=3 or 16 and X=CN, $NH_2$ or $CO_2Me$, were covalently bonded to the surface of the cleaned substrates (e.g. glass, silicon, cellulose and polyethylene containing OH functionality on its surface), by shaking these substrates with an organic solvent containing the appropriate ligand(s). The substrates were then removed from the solvent and washed a few times with ethanol and/or chloroform. In some cases, the washing also included Soxhlet treatment for a few hours. The ligand concentration in the organic solvents was usually above 0.01% w/v and in most cases above 0.1% w/v. Exemplary organic solvents are bicyclohexyl, chloroform, methylene chloride and toluene, but other solvents may of course be used. The reaction is carried out in most cases at room temperature. However, similar results can also be obtained at both lower and higher temperatures, e.g. up to the boiling point of the solvent. Ligands of the type $(RO)_3Si(CH_2)_nX$, groups by dipping the substrates containing the omega-ester groups in $LiAlH_4$ or $BH_3$ in tetrahydrofuran (THF) for a few hours at room temperature or at higher temperatures, e.g. up to 50° C.; after removal from the THF solution, the substrate was washed extensively with water, acetone and chloroform, successively.

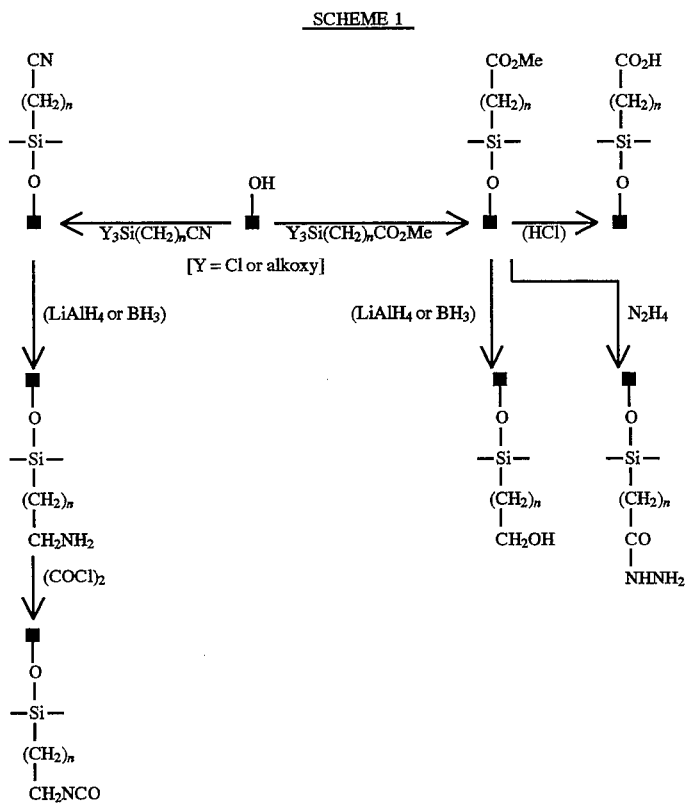

SCHEME 1 where RO is alkoxy, n=3 could also be bonded to the above substrates, by shaking the appropriate substrate with the ligand in aq. medium, e.g. for several hours at 90° C., using 0.1M sodium acetate, pH 5.5; the bonded substrate is then washed with water, ethanol and chloroform successively (Wikstrom P., Mandenius C. F. and Larsson P. O., J. of Chromatography, 1988, 455, 105).

Scheme 1 describes some of the surface modifications effected at substrate surfaces containing hydroxyl functionality, e.g., glass, cellulose, Si and modified polyethylene (PE). Cleaned surfaces containing hydroxyl functionality may be reacted with ligands such as $Cl_3Si(CH_2)_nX$ or $(RO)_3Si(CH_2)_nX$ where X is, e.g., $CO_2Me$ or CN, according to procedures described above, in order to obtain surfaces having omega-ester or cyano functionality. The ester groups can be converted to free carboxyl by soaking the substrates containing the omega-ester groups in 0.1N aqueous HCl solution, for 1 hour at room temperature; after removal from the aqueous solution, the substrate was washed extensively with water, acetone and chloroform, successively. The ester groups can be converted to hydrazide groups by soaking the substrates containing the omega-ester groups in concentrated hydrazine hydrate solution for 2 hours at 50° C.; after removal from the aqueous solution, the substrate was washed extensively with water, acetone and chloroform, successively. The ester groups can be converted to $CH_2OH$ The cyano groups can be converted to $CH_2NH_2$ groups by reducing the substrates containing the omega-cyano groups with $LiAlH_4$ or $BH_3$, as just described. The amino groups can be converted to isocyanate groups by soaking the thus-obtained substrates containing the omega-amino groups in a 20% toluene solution of phosgene, for a few hours at room temperature; after removal from the toluene solution, the substrate was washed extensively with water, acetone and chloroform, successively.

Surfaces provided with chloromethyl groups were prepared by reacting surface hydroxyl groups with ligands such as $Cl_3SiC_6H_4CH_2Cl$ according to previously described procedures. The formed surface chloromethyl groups were converted to aldehyde using a published method (Syper, L. aud Meochowski, J., Synthesis, 1984, 747).

As shown in Scheme 2, polyethylene and polypropylene surfaces are oxidized according to a published method (Whitesides, G. M. and Ferguson, G. S., Chemtracts-Organic Chemistry, 1988, 1, 171). Briefly, these substrates are oxidized by dipping them in $H_2SO_4/H_2O/CrO_3$ (29:42:29 weight ratio) solution at 70° C. for 2 minutes, followed by washing with water and acetone. Alternatively, plasma treatment of polyethylene or polypropylene results in the formation of surface hydroxyl functionality.

SCHEME 2

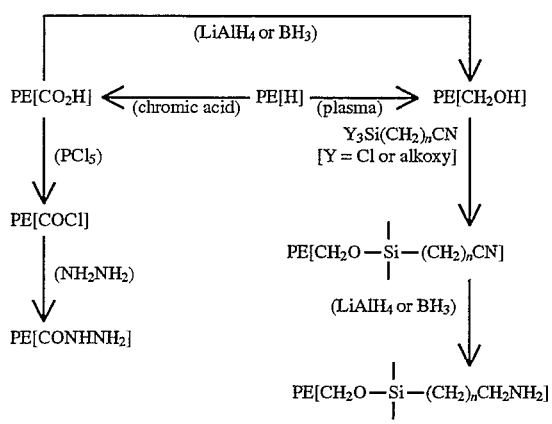

Polyethylene and polypropylene containing surface halocarbonyl groups (e.g. PE[COCl]) are obtained by dipping the oxidized polymer e.g. PE[CO$_2$H], in 10 ml. dry ether containing 1 g. PCl$_5$ for 1 hour at room temperature. The PE[COCl] (e.g.) is then removed from the ether solution and is used immediately, without further washing, for the next modification of the substrate surface.

Polyethylene and polypropylene containing surface hydrazide groups (e.g. PE[CONHNH$_2$]) are obtained by soaking the PE[COCl] (e.g.) in dry dimethylformamide solution containing 10% w/v hydrazine hydrate at room temperature for one hour. The substrate is then removed from the DMF solution and washed extensively with water, acetone and chloroform, successively.

Solid substrates such as polyethylene, polypropylene, glass and Si, containing surface isocyanate functionality (e.g. PE[NCO]) are obtained by soaking such substrates containing surface primary amine or hydrazide functionality, in dry toluene solution containing 20% phosgene at room temperature for 1 hour. The substrates are then quickly removed and used immediately for the covalent binding of appropriate polymeric microspheres.

Sensitive surface analytical methods e.g. ESCA, FTIR-ATR, ellipsometry and contact angle measurements [Balachander, N. and Sukenik, C. N., Tet. Let., 1988, 29, 55; Bain, C. D. and Whitesides, G. M., Angew. Chem. Int. Ed. Engl., 1989, 28(4), 506] prove the binding of the ligands to the substrates and the presence of the desired omega-functional groups, e.g. adsorption peak in the IR at 1750 cm.$^{-1}$ for ester groups. Scanning electron microscopy pictures are usually used to demonstrate the binding of the microspheres onto the modified substrates.

The invention will now be further illustrated by the following non-limiting Examples.

EXAMPLE 1

Glass discs containing surface covalent-bound amine functionality, prepared by reaction of Cl$_3$Si(CH$_2$)$_3$CN and/or (MeO)$_3$Si(CH$_2$)$_3$CN with surface OH groups, followed by reduction of CN to CH$_2$NH$_2$, were soaked at room temperature for 12 hours in an aqueous solution containing 1% w/v monodispersed polyacrolein microspheres of 0.7µ average diameter. The glass discs were then removed from the aqueous solution and washed extensively with water. Scanning electron microscopy (SEN) demonstrated the coverage of the glass discs with a monolayer of polyacrolein microspheres (FIG. 1). This monolayer is stable and is not removed by repeated washing with cold water and/or boiling chloroform, or by prolonged treatment with chloroform in a Soxhlet apparatus.

When a similar experiment was carried out using polyacrolein microspheres which had been pretreated with NaBH$_4$ to reduce CHO groups to CH$_2$OH, less than 3% of the surface of the glass discs was covered with microspheres.

EXAMPLE 2

Example 1 was repeated, substituting for the 1% microspheres solution, $10^{-3}$%, $10^{-1}$% and 10% w/v solutions. The percentage coverage obtained was <5%, >25% and >30%, respectively.

EXAMPLE 3

Example 1 was repeated. The washed glass discs were subsequently soaked for 12 hours in an aqueous solution containing 0.1% w/v of fluorescent polyacrolein microspheres (FITC-labelled) of 0.1µ average diameter, removed from this solution and washed extensively with water. The glass discs were highly fluorescent in a fluorescent microscope, and SEM photomicrographs showed that the 0.1µ fluorescent microspheres were bonded to the glass surfaces in between the spaces of the 0.7µ microspheres previously bonded to the glass.

EXAMPLE 4

When Example 1 was repeated using Cl$_3$Si(CH$_2$)$_{16}$CN instead of Cl$_3$Si(CH$_2$)$_3$CN, the percentage coverage decreased by approximately 10%.

EXAMPLE 5

When Example 1 was repeated, using microspheres of average diameter 0.03, 0.05, 0.4, 2.0 and 7.5µ, instead of 0.7µ, similar results were obtained for the first three sizes, but the percentage coverage for the 7.5µ diameter microspheres was below 20%, that is to say significantly less than in the other cases.

EXAMPLE 6

When Example 1 was repeated, using instead of the 0.7µ polyacrolein microspheres, fluorescent microspheres (rhodamine-labelled) and/or magnetic microspheres of 0.2µ average diameter, similar results were obtained.

EXAMPLE 7

When Examples 1–6 were repeated, using Si wafers instead of glass discs, similar results were obtained.

EXAMPLE 8

Example 1 was repeated, using polyethylene film instead of the glass discs and polyacrolein microspheres of 0.4µ (instead of 0.7µ) average diameter. FIG. 2 shows SEM photomicrographs demonstrating the gradual changes on the polyethylene film surface, during the progression of the microsphere coating process.

EXAMPLE 9

When Examples 1–6 were repeated, using polyethylene and/or polypropylene film instead of glass discs, similar results were obtained, except that in most cases, the percentage coverage of the substrate surfaces by the microspheres was approximately 10% to 30% lower.

EXAMPLE 10

When Examples 1 and 5 were repeated, using instead of the glass discs, glass tubes of 1 ml. capacity, glass flasks of 5 ml. capacity, or glass fibers of approximately 1 mm. diameter, similar results were obtained.

EXAMPLE 11

When Example 9 was repeated, using as substrate in place of the film, polyethylene fibers of approximately 1 mm. diameter, similar results were obtained.

EXAMPLE 12

When Example 1 was repeated, using polyglutaraldehyde microspheres instead of polyacrolein microspheres, similar results were obtained.

EXAMPLE 13

When Example 1 was repeated, using an ethanol solution containing microspheres in place of the corresponding aqueous solution, similar results were obtained.

EXAMPLE 14

When Example 1 was repeated, using polyacrylic acid microspheres instead of polyacrolein microspheres, similar results were obtained.

EXAMPLE 15

When Example 8 was repeated under basic conditions at pH 11.5 (in presence of diisobutylethylamine) using poly (chloromethylated styrene) microspheres instead of polyacrolein microspheres, similar results were obtained.

EXAMPLE 16

When Examples 1, 5 and 15 were repeated, using substrates containing surface hydrazide (instead of amine) functionality, similar results were obtained.

EXAMPLE 17

When Example 15 was repeated, using instead of the aqueous microsphere solution a $CCl_4$ microsphere solution, similar results were obtained, except that the bonded microspheres tended to be clustered rather than separated.

EXAMPLE 18

When Example 1 was repeated, using glass discs containing isocyanate functionality instead of amine functionality, and additionally replacing the polyacrolein microspheres in water by silica microspheres of 0.25µ average diameter in dry toluene, similar results were obtained.

EXAMPLE 19

When Example 18 was repeated at 50° C., using polyethylene film containing surface halocarbonyl groups in place of the glass discs containing isocyanate groups, similar results were obtained.

EXAMPLE 20

Example 1 was repeated, using glass discs containing aldehyde functionality instead of amine functionality, and additionally replacing the polyacrolein microspheres by albumin microspheres of approximately 0.1µ average diameter. Scanning electron microscopy photomicrographs demonstrated the binding of the microspheres to the glass. When a similar experiment was carried out, using glass discs that were coated with amine functionality and/or were not coated at all, the microspheres did not bond significantly to the glass discs.

EXAMPLE 21

When Examples 1 and 5 were repeated using $(MeO)_3Si(CH_2)_3NH_2$ which has been coated onto glass discs in aqueous solution instead of $Cl_3Si(CH_2)_3CN$, similar results were obtained.

EXAMPLE 22

Example 21 was repeated using microspheres of approximately 0.05 and 0.4µ and Eliza Titer plates (immuno plates of NUNC, Denmark), instead of glass discs. Scanning electron microscopy photomicrographs, as well as fluorescent markers (made by reacting aminoacridine with the supported microspheres) demonstrated the binding of the microspheres to the titer plates.

When a similar experiment was carried out, using titer plates that were not coated with $(MeO)_3Si(CH_2)_3NH_2$, the microspheres did not bond significantly to the titer plates.

EXAMPLE 23

Multiple layers of microspheres can be bonded onto a solid substrate by (e.g.) binding a second layer of bivalent or polyvalent reactant onto reactive sites on the surface of the first layer of microspheres, followed by a second layer of microspheres, and so on. Thus, a second layer of polyacrolein microspheres was established by first reacting $Cl_3Si(CH_2)_{16}CN$ with the initial monolayer of polyacrolein microspheres bonded to glass discs, obtained as described in Example 1, then reducing the free CN groups derived from the reactant to $CH_2NH_2$ groups, and finally bonding a second layer of polyacrolein microspheres of 2µ average diameter, as described in Example 1.

EXAMPLE 24

Cationic ion exchange resins were produced by oxidizing the aldehyde groups of the bonded polyacrolein microspheres, to carboxyl groups. The oxidation was effected by passing oxygen for 6 hours through a 0.1M NaOH aqueous solution containing the substrate-bonded polyacrolein microspheres.

EXAMPLE 25

Cationic ion exchange resins were also obtained by the covalent binding of 1-aminopropanesulfonic acid (1-APSA) to the substrate-bonded polyacrolein and/or poly (chloromethylated styrene) microspheres. This was accomplished by soaking the substrate-bonded microspheres for 12 hours at room temperature in aqueous solution at pH 11, containing 100 mg. of 1-APSA. The thus-modified substrate-bonded microspheres were then removed and washed extensively with water followed by acetone. Anionic exchange resins were obtained in similar manner, by using N,N-diethylaminoethylamine (DEAE) in place of the 1-APSA.

EXAMPLE 26

In this example, a radiolabelled protein is immobilized at the surface of glass disc substrate-bonded polyacrolein or polyglutaradehyde microspheres, average diameter about prepared as described in Examples 1, 12 and 16, respectively, by shaking the thus-supported microspheres for 24 hours at room temperature with a saline solution (0.5 ml.) containing $^{125}$I-Bungarotoxin (64 μg.), followed by repeated washing (decantation) with saline solution to remove unbound $^{125}$I-Bungarotoxin. A Γ counter showed that approximately 1,300 picomoles/cm.$^2$ protein was bonded to each of the supported microsphere systems.

When a control experiment was carried out, in which the supported microsphere system was first pretreated with NaBH$_4$ (to reduce the aldehyde groups), it was found that only about 5 picomoles/cm$^2$ $^{125}$I-Bungarotoxin was bonded to each of the supported microsphere systems.

EXAMPLE 27

When Example 26 was repeated, but using Protein A instead of Bungarotoxin, similar results were obtained. The product could then be used for removing trace amounts of immunoglobulins.

EXAMPLE 28

Poly (chloromethylated styrene) microspheres bonded to polyethylene film, prepared according to Example 15, were shaken for 24 hours at 50° C. with an aqueous solution of 0.1% (w/v) deferoxamine at pH 11.5, unbonded deferoxamine was removed by repeated water washing (decantation). The immobilized deferoxamine product could be used for the removal of traces of FeCl$_3$ from aqueous solutions.

EXAMPLE 29

Substrate-bonded microspheres prepared according to Examples 1 and 15 were soaked for a few hours at room temperature in an aqueous solution containing 0.1% phenol red. The colored product was washed several times with benzene and then air dried. On introducing into water, the phenol red slowly diffused therefrom, so that the intensity of the red color in water increased gradually. This illustrates the possibility of using such products for controlled release purposes.

EXAMPLE 30

Substrate-bonded microspheres prepared according to Example 1 were treated with gelatin at pH 7.0, in a similar manner to the procedure of Example 26. The product was shaken for 1 hour with a physiological solution (PBS) containing 1% fixed human red blood cells, then washed several times with PBS. The attached red blood cells showed up clearly under the microscope. This demonstrates the potential use of the supported microspheres of the present invention for cell immobilization, and thus also for cell growth.

EXAMPLE 31

The wells of Eliza titer plates coated with polyacrolein microspheres of 800 Angstrom units average diameter were incubated at room temperature for approximately 15 minutes with 0.1 ml PBS solution containing 0.1 μg sheep immunoglobulins (SIgG). The Eliza plates were then washed thoroughly with PBS. Residue aldehydes and amines were blocked by incubating the plate/microsphere supported SIgG with 1% bovine serum albumin and 1% ethanolamine in aqueous solution. Biotinylated antibodies against the SIgG were determined by using a common Eliza procedure of interacting the supported SIgG with serial dilutions of the biotinylated antibodies against SIgG; this was followed by reaction of the SIgG-bound antibodies with Extravidin peroxidase. The detection limit of this system was approximately 1 ng.

When similar experiments were performed using non-coated Eliza titer plates and/or Eliza titer plates coated with amines instead of plates coated with microspheres, the detection limit was decreased significantly.

While the present invention has been particularly described with reference to preferred embodiments thereof, it will be appreciated by persons skilled in the art that many variations and modifications may be made. Accordingly, the invention is not to be construed as limited to such preferred embodiments, rather the scope and spirit of the invention are to be understood from the claims which follow.

I claim:

1. A method of manufacturing an article having a monolayer of microspheres comprising:

reacting a surface of a solid substrate with a connecting ligand to covalently bond the ligand to the surface of the substrate to form a ligand-bonded substrate; and contacting the ligand-bonded substrate with a dispersion of microspheres that contain intrinsic reactive functions, in a liquid carrier, for a time sufficient to covalently bond the microspheres to the ligand; and wherein after formation of microsphere/ligand covalent bonds, residual unreacted intrinsic reactive functions remain in the microspheres;

said article being further characterized by the fact that the microspheres are bound to said substrate by means consisting of said connecting ligand.

2. A method in accordance with claim 1, further including the step of pretreating the surface of the solid substrate, prior to reacting the surface of the substrate with the ligand, to render the substrate surface reactive with said ligand.

3. A method in accordance with claim 1, wherein the substrate has a surface hydroxyl functionality and the ligand is selected from the group consisting of p-Cl$_3$SiC$_6$H$_4$CH$_2$Cl, Cl$_3$Si(CH$_2$)$_n$X; (RO)$_3$Si(CH$_2$)$_n$X; and mixtures, and wherein RO is an alkoxy, n=3 or 16, and X=CN, H$_2$N or CO$_2$CH$_3$, to provide a functionality selected from the group consisting of an omega-CH$_2$Cl, —CN, —NH$_2$, and —CO$_2$CH$_3$, respectively.

4. A method of manufacturing an article having a plurality of layers of microspheres, including the steps of:

reacting a surface of the solid substrate with a first ligand to covalently bond the first ligand to the surface of the substrate to form a ligand-bonded substrate; and contacting the ligand-bonded substrate with a dispersion of first microspheres, that contain intrinsic reactive functions, in a liquid carrier, for a time sufficient to covalently bond the first microspheres to the ligand;

reacting the first microspheres with another ligand disposed farthest from the substrate, said another ligand being the same as or different from the first ligand, to covalently bond the first microspheres to said another ligand; and contacting said another ligand with another dispersion of microspheres, that contain intrinsic reactive functions, said another microspheres disposed farthest from the substrate, for a time sufficient to covalently bond said another microspheres to the second ligand, said another microspheres being the same or different from said first microspheres; and wherein after formation of microsphere/ligand covalent bonds, residual unreacted intrinsic reactive functions remain in the microspheres;

said article being further characterized by the fact that said microspheres are bound to said substrate by means consisting of said first ligand.

5. A method in accordance with claim 4 further including the step of covalently bonding said first microspheres to one or more intermediate layers of ligand, and covalently bonding each one or more said intermediate layers respectively to one or more intermediate layers of microspheres, that contain intrinsic reactive functions, prior to contacting the another ligand with the another microspheres; and wherein after formation of microsphere/ligand covalent bonds, residual unreacted intrinsic reactive functions remain in the microspheres.

* * * * *